United States Patent [19]
Hazenbroek et al.

[11] Patent Number: 5,947,811
[45] Date of Patent: Sep. 7, 1999

[54] APPARATUS FOR CUTTING UP CARCASSES OF POULTRY

[75] Inventors: Jacobus E. Hazenbroek, Numansdorp; Gerrit Barendregt, Heinenoord, both of Netherlands

[73] Assignee: Systemate Holland, B.V., Numansdorp, Netherlands

[21] Appl. No.: 08/835,981

[22] Filed: Apr. 10, 1997

[51] Int. Cl.[6] ................................................. A22C 21/00
[52] U.S. Cl. .......................... 452/167; 452/169; 452/154
[58] Field of Search ..................... 452/167, 166, 452/169, 165, 151, 154, 155

[56] References Cited

U.S. PATENT DOCUMENTS

| | | | |
|---|---|---|---|
| 3,201,823 | 8/1965 | Mathews | 452/167 |
| 4,271,561 | 6/1981 | Lewis | 452/167 |
| 4,935,990 | 6/1990 | Linnenbank | 452/167 |
| 5,015,213 | 5/1991 | Hazenbroek | 452/167 |
| 5,069,652 | 12/1991 | Hazenbroek | 452/166 |
| 5,154,665 | 10/1992 | Hazenbroek | 452/167 |
| 5,176,563 | 1/1993 | Van den Nieuwelaar et al. | 452/167 |
| 5,188,559 | 2/1993 | Hazenbroek | 452/167 |
| 5,484,333 | 1/1996 | Martin et al. | 452/167 |
| 5,545,083 | 8/1996 | Bargere' et al. | 452/165 |

*Primary Examiner*—Willis Little
*Attorney, Agent, or Firm*—Thomas, Kayden, Horstemeyer & Risley

[57] ABSTRACT

The poultry cut-up apparatus receives vertically halved poultry carcasses in an inverted attitude transported along an overhead conveyor. Vertically spaced, horizontally oriented pairs of circular cutting blades (21, 22) cut the carcasses into segments as the carcasses are maintained in desired attitudes by flight blocks (17) that move in unison with the shackles of the conveyor, with the cutting blades extending into aligned grooves (48) of a flight block to reach and cut the poultry carcasses into segments, as guide bars (19 and 20) are received in similar grooves of the flight block to hold the carcasses in the proper location for cutting.

39 Claims, 5 Drawing Sheets

APPARATUS FOR CUTTING UP CARCASSES OF POULTRY

TECHNICAL FIELD

This invention relates generally to automated poultry processing and particularly to an apparatus for cutting up carcasses of poultry. More specifically, this invention relates to an apparatus for cutting up carcasses of poultry into at least two pairs of mutually substantially similar parts, in particular two parts comprising a wing and two parts comprising a leg.

BACKGROUND TO THE INVENTION

The development of automated poultry processing equipment has dramatically increased the speed and efficiency of poultry processing. Most modern poultry processing equipment comprise several automated stations at which a plurality of different processing steps can be performed in an automated manner, while the carcasses are being conveyed therealong, along a processing or conveying path, suspended by their legs from shackles depending from an overhead conveyor. Various processing machines are disposed along the processing path for operating upon the suspended carcasses progressively as they move along the path to prepare the poultry for public sale and consumption. A typical poultry processing line might, for example, include a vent cutter, a bird opener, an eviscerator, a neck breaker, a lung puller and a crop remover. In addition, such a processing line might include machines for cutting up or subdividing the carcasses into their various commonly consumed pieces or parts such as breast, backs, wings, legs, drumsticks and thighs.

In their continuous attempts to process and offer to the public poultry parts of a constant quality and shape, the food processing industry and restaurants have a need for poultry parts that do not vary in dimensions to such a degree that processing would require additional attention and interventions and the consumer would be offered poultry parts that differ from each other in shape or weight to a noticeable extent.

Presently known poultry processing equipment adapted for cutting wings, legs, thighs and/or drumsticks comprise a stationary guiding and centring system for guiding and centring the carcasses along past stationary circular cutting knives that are oriented to cut through the carcass at the desired location. An example of such equipment is disclosed in Dutch patent application 86.02208, in which an apparatus is described with which the carcasses depending from an overhead conveyor are cut through according to a substantially horizontal cut midway their body and subsequently the upper part and the lower part are driven separately by means of the overhead conveyor and a chain conveyor positioned below and engaging the lower part, respectively, to vertically arranged cutting knives in order to separate each of these parts into halves, each comprising a leg or a wing.

Another example of such equipment is disclosed in U.S. Pat. No. 4,251,901, according to which the carcasses are conveyed side by side depending from an overhead conveyor passed along an elongated carrousel which has a section that runs parallel to the conveyor and is provided with a plurality of holding members for holding the carcasses in a correct orientation when the carcasses are passed along one of the stationary cutting knives. The carrousel comprises cam tracks so as to cant the holding members in a vertical plane perpendicular to the direction of travel of the carcasses.

Yet another example of such equipment is disclosed in U.S. Pat. No. 4,558,490. In this known apparatus the carcasses are supported by block-shaped supports which are provided with a plurality of carcass support bars and are suspended on an overhead conveyor system travelling according to a closed elongated roundgoing path. The carcasses are slid onto the blockshaped supports by hand. The block-shaped supports can be rotated about a vertical axis in order to position the carcasses in a first section with the breast sidewards to be cut transversely by two knives arranged at one same side of the path of travel and mutually including an angle to remove a breast portion, in a second section with the back forward to enable two cutting knives placed on either side of the path of travel to cut off the wings and one central cutting knife to cut the carcass longitudinally and in a third section with its breast to the side again to enable one lateral cutting knife to cut the carcass halves in one cross cut over their full width and another lateral cutting knife to cut through the legs to separate the thighs from the drum sticks.

These known processing equipments are capable of delivering poultry parts or pieces which for the main part vary only to a limited extent from each other, yet it may occur that the dimensions of like parts differ from each other to an unacceptable degree. Moreover, even small differences in the size of like parts may lead to refused poultry parts for the reason that the above-mentioned industries request poultry parts that are virtually identical.

Thus there is a need for poultry processing apparatus for cutting up carcasses of poultry into at least two pairs of mutually substantially similar parts, in particular two parts comprising a wing and two parts comprising a leg which allows for a separation of the said parts with a high degree of reciprocability and reliability.

It is an object of the invention to provide such an apparatus.

It is a further object of the invention to provide such an apparatus with which the carcasses can be processed at high speeds.

It is still a further object of the invention to provide an automated apparatus of the type described above which processes the carcasses with a high degree of accuracy.

It is yet a further object of the invention to provide an apparatus for cutting up carcasses of poultry into three pairs of mutually substantially similar parts, in particular two parts comprising a wing, two parts comprising a full leg and two parts comprising breast and back portions adjoining and intermediate said wing parts and said full leg parts.

SUMMARY OF THE INVENTION

From one aspect, these objects and others are achieved by means of an apparatus for separating carcasses of slaughtered poultry into parts when the carcasses are transported with their legs supported in shackles forming part of an overhead conveyor system according to a conveying path, while said legs are on either side of said conveying path, said apparatus comprising:

a frame for supporting the apparatus on a ground, below said conveying path;

at least one pair of knives mounted on said frame, the knives of each said pair of knives being arranged on either side of said conveying path, a first pair of said at least one pair of knives being arranged for cutting the carcasses transversely to separate the wings from the carcasses;

means for positioning the carcasses in a proper position with respect to the knives during conveyance of the carcasses, said positioning means comprising stationary, first centring means on said frame for centring the carcasses with respect to the conveying path by engaging and guiding the carcasses between their legs;

stationary means on said frame for guiding and sidewardly confining the outer portions of the carcasses by engaging the side surfaces thereof; and a device comprising a movable series of means for entraining each one of said carcasses along in the direction of the conveying path, said entraining means being provided with surfaces for supporting and positioning said carcasses, wherein said device is arranged below said overhead conveyor and comprises a bearing surface for supporting the lower end of the carcasses.

With the apparatus according to the invention, the carcasses are supported on a co-travelling surface so that the vertical position of the carcass body is stabilized. Vertical displacements of portions of the carcasses resulting from the gravity forces acting on the carcasses depending from the shackles, such as stretching, are avoided to a large extent. The conveyance of the carcasses along the knives is more reliable since the carcasses are engaged at the upper end at their legs by the shackles and at a lower portion of their body by the entraining means, so that driving forces on the carcasses are divided over a large surface of the carcasses. Frictional forces resulting from transportation of the carcasses which might disturb a correct position of the carcasses for cutting are kept to a minimum. In addition, in fact, prior to and during cutting the overhead conveyor might be used only for keeping the legs upright.

Preferably, the overhead conveyor is provided with first driving means for driving the overhead conveyor and the flight conveyor device is provided with second driving means for driving the flight conveyor device, said first and second driving means being separate, the apparatus being furthermore provided with control means for adjusting said second driving means so as to index the speed of the flight conveyor device to the speed of the overhead conveyor.

Preferably, said control means comprise means for determining the rate and the position of the flight means and means for determining the rate and the position of the shackles of the overhead conveyor and comparator means for comparing said rates and relative positions with each other and to control the second driving means in dependence on said comparison.

Preferably, said device is a flight conveyor device comprising a flight conveyor adapted to be driven along said conveying path, said flight conveyor being provided with a plurality of flight means spaced from each other at regular intervals in the direction of the conveying path and being arranged symmetrically with respect to the conveying path and being provided with surfaces for engaging behind body portions of the carcasses and to urge them along in the direction of the conveying path.

Preferably, the flight means have a front portion that is provided with second centring means for engaging the carcasses from behind in a middle portion of their body and to urge the two halves of the carcasses sidewards away from each other to either side of said second centring means.

Preferably, the second centering means are arranged to travel along a path that is adjacent and below the centring means so as to ensure complete separation of the two carcass halves.

Preferably, said guiding means comprise first guiding members arranged laterally to the conveying path and wherein said flight means are designed to engage outwardly sidewards about said first guiding members.

Preferably said guiding means comprise second guiding members arranged laterally to the conveying path and arranged at a distance above said first guiding means, wherein said flight means are designed to engage outwardly sidewards about said second guiding members.

Preferably, said flight means comprise support surfaces for supporting said carcasses inwardly sidewards. Advantageously, these support surfaces form part of said second centring means.

Preferably, said flight means comprise confining surfaces for holding down the breast bone tip of said carcasses.

Preferably, said flight means are designed to engage outwardly sidewards about the knives of said first pair of knives. Thus, the carcasses are supported backwards in areas surrounding the intended location of cutting, so that the portion that is to be cut remains in the proper position for cutting and the surrounding meat does not shift during cutting. As a result, the cut will be made at the correct location.

Preferably, the apparatus of the invention comprises a second pair of knives mounted on said frame at a level above the level of said first pair of knives for separating the legs from the carcasses.

In case of the presence of said confining means for the tail bone, said second pair of knives is preferably arranged at a level just above said confining surfaces.

Preferably, the first and/or second pair of knives are arranged substantially horizontal. Preferably, the bearing surface of the flight conveyor device is substantially horizontal.

In a preferred further development of the apparatus of the invention said flight means is shaped as a flight block having a substantially T-shaped horizontal cross section, with the stem of the T being directed in the direction of the conveying path, the base of the T and the stem comprising support surfaces for confining the carcasses inwards and backwards.

Preferably, said flight block is designed with a plurality of sidewardly opening slots for respective lateral guiding members, such as guiding bars, and respective knives.

From another aspect the invention provides an apparatus for separating carcasses of slaughtered poultry into parts when the carcasses are transported with their legs supported in shackles forming part of an overhead conveyor system according to a conveying path, while said carcasses are with their two longitudinal halves on either side of said conveying path, said apparatus comprising:

a frame for supporting the apparatus on a ground, below said conveying path;

at least one pair of knives mounted on said frame, the knives of each said pair of knives being arranged on either side of said conveying path;

means for positioning the carcasses in a proper position with respect to the knives during conveyance of the carcasses, said positioning means comprising first confining means which are arranged for being moved along with the carcasses and are adapted for restraining the carcass halves transversely inwards and to keep them separated and stationary second confining means on said frame for restraining the carcass halves transversely outwards. Thus, the carcass halves are positively held in both directions transverse to the direction of travel so that the cutting operation can be performed in a reliable manner.

Preferably, the positioning means further comprises third confining means which are arranged for being moved along with the carcasses and are adapted for restraining the carcass halves backwardly.

Preferably, the positioning means further comprises fourth confining means which are arranged for being moved along with the carcasses and are adapted for restraining the breast bone tip upwardly.

Preferably, the positioning means comprises fifth confining means which are arranged for being moved along with the carcasses and are adapted to support the lower end of the carcasses.

Preferably, the positioning means comprises sixth confining means which are arranged for being moved along with the carcasses and are adapted to engage the carcass halves in the area above the thigh joints.

Preferably, said first confining means comprises a substantially vertical bearing surface which is provided with a projection arranged for engaging an upper portion of the inside surface of the breast cavity.

Preferably, the apparatus comprises a first pair of knives and a second pair of knives, said first pair of knives being arranged at a distance below said second pair of knives, wherein said second confining means comprise guiding means arranged for engaging the carcass halves between said two pairs of knives to urge said carcass halves transversely inwards.

Preferably, said first and said second pair of knives are arranged vertically above each other at a distance within the range of 53 mm–65 mm, more preferably at a distance of 63 mm. Preferably, the distance of the first pair of knives above the bearing or support surface for the lower end of the carcass is within the range of 40 mm–50 mm, and preferably 47 mm.

Preferably, the apparatus is further designed for treating carcasses that have been divided into two halves, further comprising a separating device for keeping the carcass halves at a distance from each other separated according to a longitudinal plane of separation coinciding with the conveying path, said separating device being mounted on said frame.

The invention will now be elucidated in the following detailed description of an exemplary embodiment of the apparatus of the invention taken in conjunction with the accompanying drawings.

DETAILED DESCRIPTION OF THE PREFERRED EMBODIMENT

Figure 1:
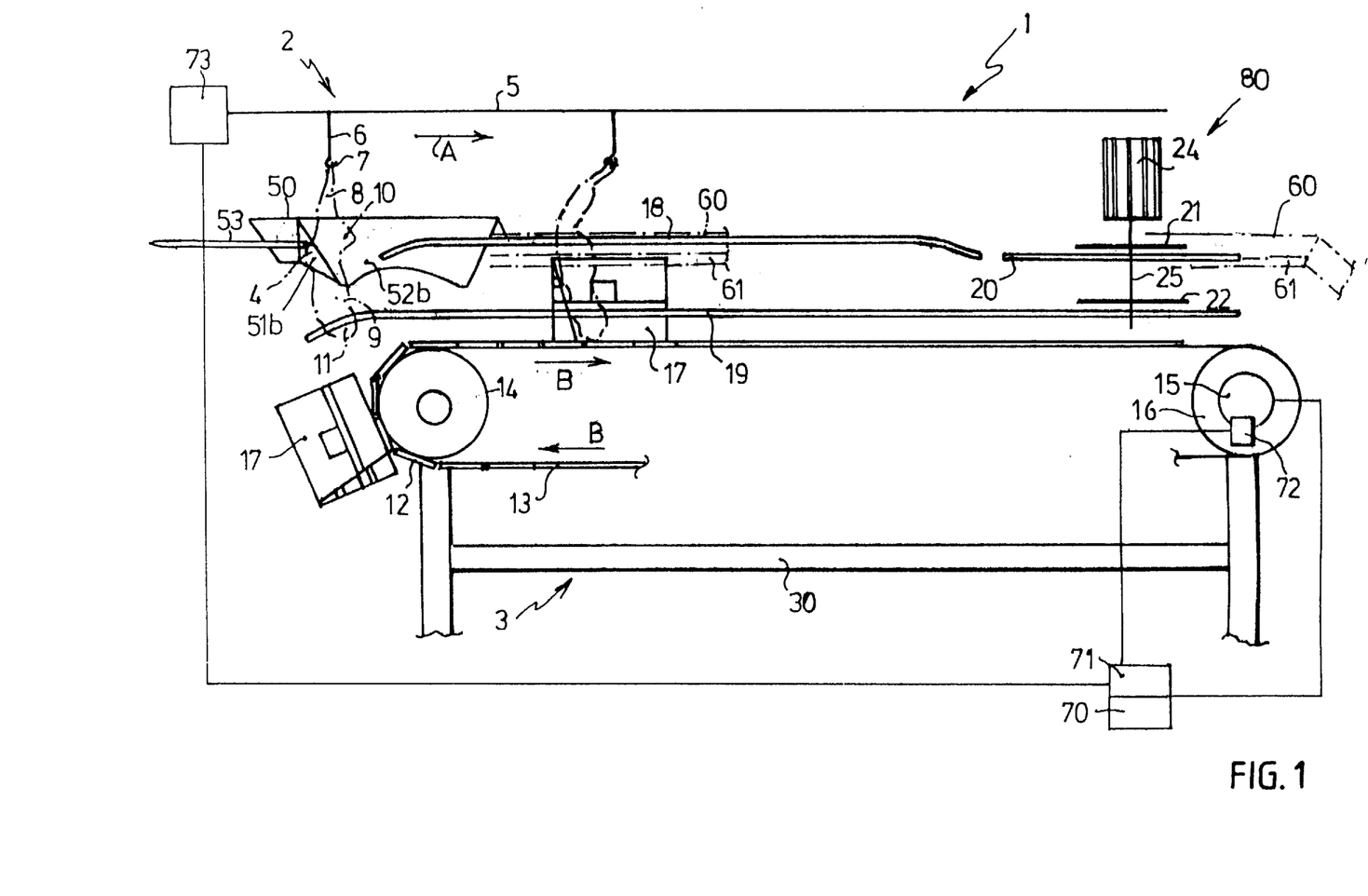
FIG. 1 is a side view of a preferred embodiment of the apparatus of the invention.

The apparatus 1 depicted in FIG. 1 comprises a frame 30 which is deposited on a ground and on which are mounted, in a manner not shown but evident to the person skilled in the art, a flight conveyor 3, guiding bar pairs 18, 19 and 20, centring and dividing plate 50 and cutting station 80.

Located vertically above the flight conveyor is an overhead conveyor 2 of a type well known in the art. The overhead conveyor 2 comprises a guide tube 5 on which poultry leg brackets 6 are slidably supported. The shackles are interconnected by a pulling wire or chain which is driven by a drive (not shown) in the direction A (conveying path). As a result, the shackles are driven in the direction A and so are poultry carcasses 4 that are suspended upside-down with their leg ends received in the shackles 6.

In a halving device located just upstream from the apparatus 1, the poultry carcasses 4 are divided into two halves 4a, 4b that are positioned parallel, adjacent each other, at either side of the plane of symmetry S of the carcass, which plane of symmetry is parallel to the direction A. Each carcass half has a leg 8a, 8b and a wing 11a, 11b, as well as a body portion 9 connecting the leg and the wing and including a back bone area 10.

Hereafter reference numerals having added thereto an 'a' and a 'b' are located on the side of the carcass halves 4a and 4b, respectively.

The centring and orienting device 50 (FIG. 2) is symmetrical with respect to the conveying path and at the forward end the device 50 is provided with a pair of diverging centring bars 54 and bow-like arranged centring plates 53 which engage the carcass up to a level above the vent. Downstream from plates 54, the device 50 is provided on both sides with dividing plates 51 and 52 that progressively urge the carcass halves away from each other. The plates 52 function moreover in orienting and positioning the carcass halves correctly so that they can be received and engaged by the flight conveyor 3, as will be discussed hereafter.

Figure 2:
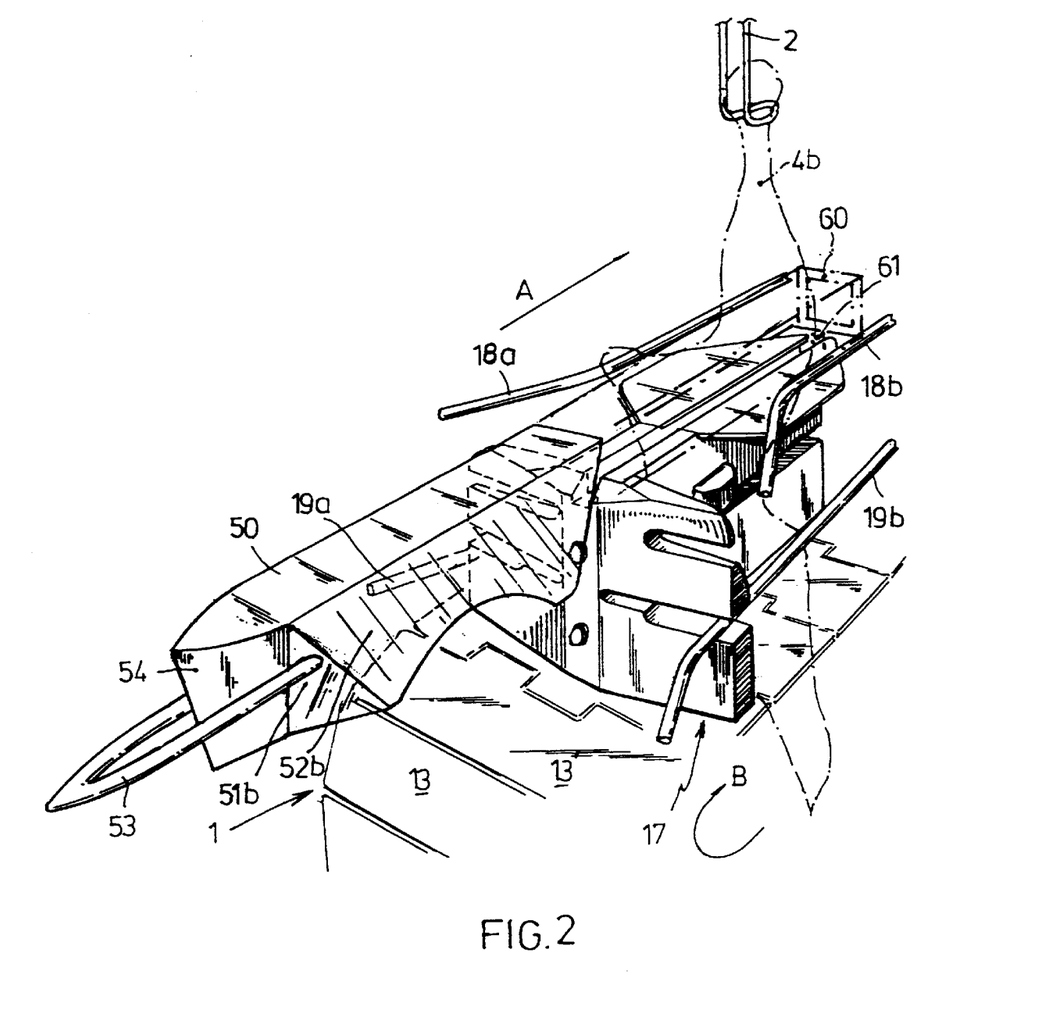
FIG. 2 is a perspective view of an entrance part of the apparatus of FIG. 1.

Pairs of guiding bars 18, 19 and 20 are mounted on the frame 30 on either side of and above the flight conveyor 3. Guiding bars 18a, 18b are arranged for engaging the outer sides of the thigh portions of the legs 8 of the carcass 4 so that the breast bone tip 10 will be rotated towards a leading position. Guiding bars 19 are arranged to engage the oyster area of the carcass 4 with surface 19' (19a'). Guiding bars 20 are arranged for engaging the back area just below the breast bone tip 10 with surface 20' (20a'). Surface 19a' and 20a' thus function as (second) confining means, which are stationary.

Figure 3:
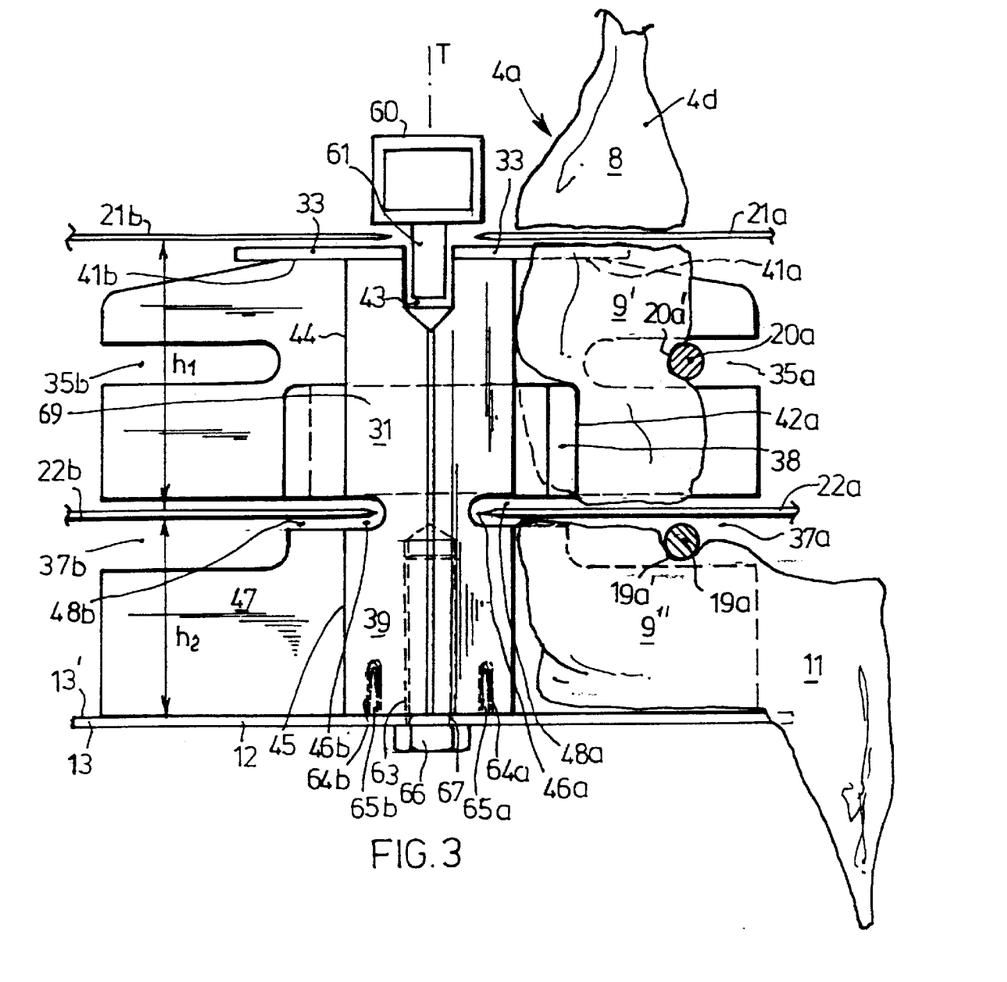
FIG. 3 is a front view of the cutting station of the apparatus of FIG. 1.

The cutting station 80 comprises two pairs of circular cutting blades 21, 22, the cutting blades of each pair 21, 22 being arranged on either side of the plane of symmetry T. The cutting blades on either side are arranged horizontally and are both mounted on a vertical drive axis 25 which is driven by electromotor 24 in such direction that the cutting edge of the cutting blades 21,22 rotates in an outwards direction and against direction A where the carcass meets the cutting blades.

The flight conveyor 3 comprises a belt 12 consisting of a plurality of metal transverse plates 13 which are interconnected with each other and provide an almost continuous support or bearing surface 13'. The belt 12 runs about stationary wheels 14, 15, wheel 15 having a shaft being driven by electromotor 16, so that the belt is driven in the direction B.

Electromotor 16 is controlled by controller 70. The rate and position of the flight conveyor 3 is monitored by the encoder 72, which monitors the number of revolutions of the shaft of wheel 15 and the rate and position of the overhead conveyor shackles is monitored by shackle counter 73, e.g. a photosensor. Encoder 72 and counter 73 deliver their signals to a comparator 71, included in controller 70, which furthermore includes a timer. On the basis of the comparison of both signals by the comparator, the controller controls the motor 16 to adjust the rate and the relative position of the flight conveyor in accordance with the rate and position of overhead conveyor 2 to bring it into conformity with a preset ideal relative position. The ideal relative position between shackles and blocks is set on beforehand in the controller 70 in the initial test phase of operation. The ideal relative position varies with the size of the poultry to be processed.

Figure 4:
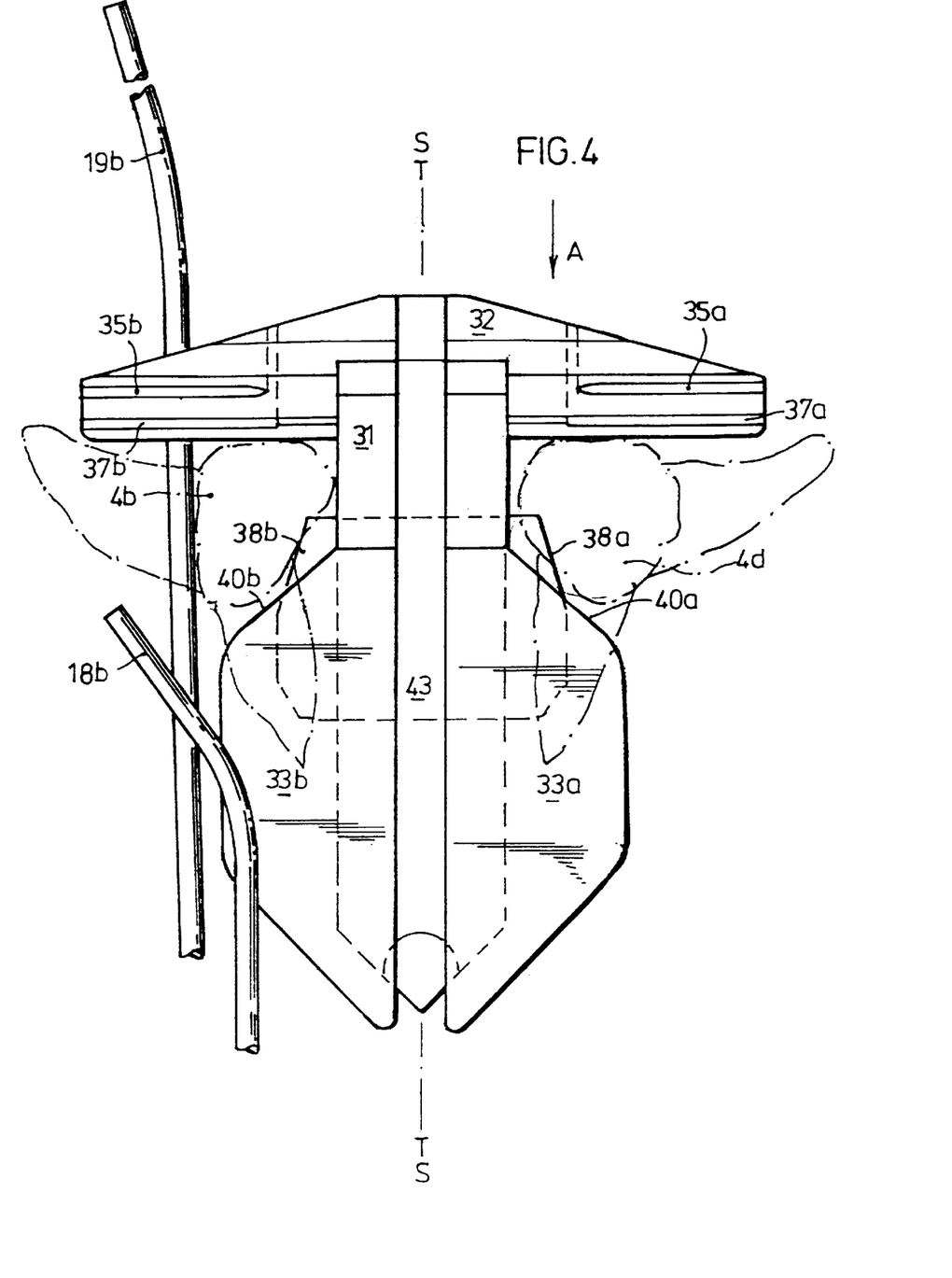
FIG. 4 is a top view of a flight block of the apparatus of FIG. 1 at the entrance of the apparatus (only guiding bars depicted).

A plurality of flight blocks 17 substantially consisting of polyethylene 500 are releasably attached on the belt 13 at regular intervals. As can be seen in FIG. 4, the flight blocks have a plane of symmetry T and are substantially T-shaped in top view, while, as can be seen in FIG. 2, transverse plates 33a,b—preferably of metal—are bolted to the upper side of stem portion 31 of the T. Each horizontal plate 33a,b has a lower surface 41 that forms a restraining plane (fourth confining means) for the breast bone tip (half) 10 of the carcass halves 4a,b so as to keep it down below the cutting blades 21 (vide FIG. 3). Backward edges 40a,b are located for engaging the carcass halves at areas above the thigh joint and to restrain these areas in an inward and forward direction. These edges form sixth confining means.

The stem portion 31 has a tapering leading edge 39 and has longitudinal sides on either side of plane T or S which form substantially vertical and parallel surfaces 44, 45 (first confining means). The surfaces 44 and 45 are separated from each other by a horizontal and longitudinal groove 46 (FIGS. 3 and 5) which serves to receive the cutting edge of cutting blade 22. The stem portion 31 is moreover provided with spacer blocks 38a,b, which project to both sides from surfaces 44, just above groove 46, in order to, to some extent, provide a proper bearing surface for the inside of the carcass half, in particular the breast cavity. Depending on the size of the poultry, it may be desired to locate the blocks 38 on the surfaces 45, just below grooves 46.

Figure 5:
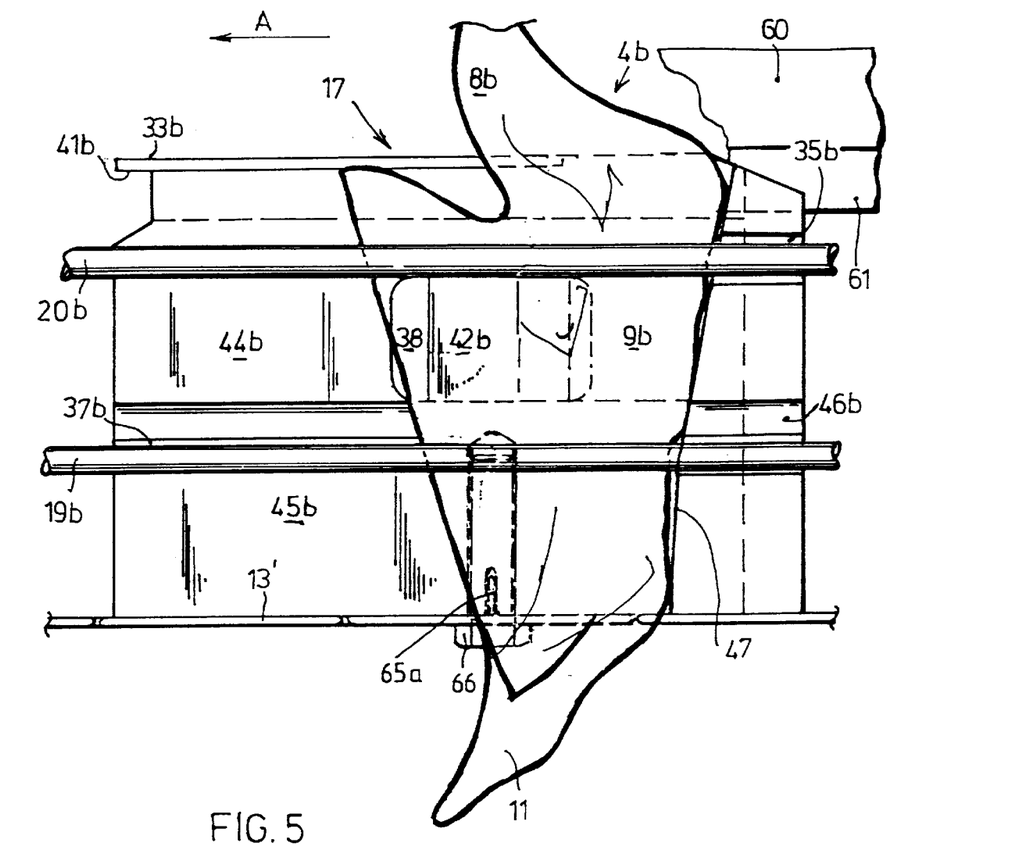
FIG. 5 is a side view of a flight block of the apparatus of FIG. 1.

Spacer blocks 38a,b are formed as one elongated body 38 which is accommodated in transverse hole 69 in stem portion 31, and is secured therein by means of a screw bolt (not shown) which extends from the rear of the base portion 32 into the stem portion 31 and may also serve to attach the stem portion 31 at the base portion 32 to each other, if these portions are separate portions.

The base portion 32 of the flight block 17 has surfaces 47 (third confining means) that have a normal that is almost parallel to the direction A but, as can be seen in FIG. 5, slightly downwardly inclined in that direction. Moreover, the surfaces 47 are slightly convex so as to provide a smooth bearing surface which follows the contours of the breast portions of the carcass 4.

The base portion 32 is moreover provided with two pairs of horizontal sidewardly extending slots 35 and 37, which are arranged for receiving the guiding bars 20 and 19, respectively. In addition, the slots 37 have an upper area 48 for receiving the cutting edge of cutting blade 22, which area 48 connects to groove 46 in stem portion 31.

As can be seen in FIG. 3, both the stem portion 31 and the base portion 32 of the block 17 are provided with a longitudinal groove 43 in their upper side. The groove 43 has a substantially rectangular cross section that fits with stationary centring bar 61 which is attached to the lower side of centring bar 60, which bar 60 extends from the area of the downstream end of centring and dividing device 50. It will be recognized that the stem portion 31 and the centring bars 60 and 61 form a dividing wall for the two carcass halves 4a and 4b as well as a horizontal inward bearing surface therefor. Moreover, the bar 61 provides an upper centring means for the flight block 17 as well as inward sideward abutments for additionally preventing a sideward canting of the blocks 17.

As can be seen in FIGS. 3 and 5, the stem portion 31 of the block 17 is provided with a central threaded hole 63 and with two shorter holes 64a, 64b on either side thereof. Plate 13 is provided with a hole 67 for passing through a screw bolt 66, which is threaded into hole 63 in order to fasten the block 17 onto plate 13. On either side of hole 67 upwardly projecting studs 65a, 65b are secured to the upper surface of plate 13, in order to engage in the holes 64a, 64b, respectively, to properly orient the block 17 on the plate 13. The use of a connection for the block 17 to only one plate 13 enables the blocks and plates to be conveyed along a roundgoing path, and facilitates easy removal and mounting of the blocks.

The apparatus 1 allows carcasses to be cut into parts that meet the demands of the present-day food industry, in particular the fast-food industry. Due to the support on moving belt 12 and the various stationary restraining surfaces 19a' and 20a' and movable restraining surface 44, 45, 47, 41, 40 cooperating with each other, the sizes of similar parts cut from the carcasses will not vary to a noticeable degree. In this example, the cutting blades $h_2$ 22 and the surface 13' are arranged at a vertical distance of 47 mm above each other, while the cutting blades 21 are arranged at a distance $h_1$ of 63 mm above the cutting blades 22 and just above plates 33. As can be seen in FIG. 3, the carcass halves 4a,b will be cut up into a (upper) leg portion 8, an intermediate back/breast portion 9' and a (lower) combined back/breast and wing portion 9"/11.

We claim:

1. Apparatus for separating carcasses of slaughtered poultry into parts when the carcasses are transported with their legs supported in shackles forming part of an overhead conveyor system according to a conveying path, while said legs are on either side of said conveying path, said apparatus comprising:

a frame for supporting the apparatus on a ground, below said conveying path;

at least one pair of knives mounted on said frame, the knives of each said pair of knives being arranged on either side of said conveying path, a first pair of said at least one pair of knives being arranged for cutting the carcasses transversely to separate the wings from the carcasses;

means for positioning the carcasses in a proper position with respect to the knives during conveyance of the carcasses, said positioning means comprising stationary, first centring means on said frame for centring the carcasses with respect to the conveying path by engaging and guiding the carcasses between their legs;

stationary means on said frame for guiding and sidewardly confining the outer portions of the carcasses by engaging the side surfaces thereof; and a device comprising a movable series of means for entraining each one of said carcasses along in the direction of the conveying path, said entraining means being provided with surfaces for supporting and positioning said carcasses, wherein said device is arranged below said overhead conveyor and comprises a bearing surface for supporting the lower end of the carcasses.

2. Apparatus according to claim 1, said device being a flight conveyor device comprising a flight conveyor adapted to be driven along said conveying path, said flight conveyor being provided with a plurality of flight means spaced from each other at regular intervals in the direction of the conveying path and being arranged symmetrically with respect to the conveying path and being provided with surfaces for engaging behind body portions of the carcasses and to urge them along in the direction of the conveying path.

3. Apparatus according to claim 2, wherein the flight means have a front portion that is provided with second centring means for engaging the carcasses from behind in a middle portion of their body and to urge the two halves of the carcasses sidewardly away from each other to either side of said second centring means.

4. Apparatus according to claim 3, wherein the second centring means are arranged to travel along a path that is adjacent and below the centring means so as to ensure complete separation of the two carcass halves.

5. Apparatus according to claim 2, wherein said guiding means comprise first guiding members arranged laterally to the conveying path and wherein said flight means are designed to engage outwardly sidewards about said first guiding members.

6. Apparatus according to claim 5, wherein said guiding means comprise second guiding members arranged laterally to the conveying path and arranged at a distance above said first guiding means, wherein said flight means are designed to engage outwardly sidewards about said second guiding members.

7. Apparatus according to claim 2, wherein said flight means comprise support surfaces for supporting said carcasses inwardly sidewards.

8. Apparatus according to claim 2, wherein said flight means comprise confining surfaces for upwardly restraining the breast bone tip of said carcasses.

9. Apparatus according to claim 2, wherein said flight means are designed to engage outwardly sidewards about the knives of a first pair of said at least one pair of knives.

10. Apparatus according to claim 1, further comprising a second pair of knives mounted on said frame at a level above the level of said first pair of knives for separating the legs from the carcasses.

11. Apparatus according to claim 10, wherein said flight means comprise confining surfaces for restraining the tail bone of said carcasses upwardly and said second pair of knives is arranged just above said confining surfaces.

12. Apparatus according to claim 11, wherein said confining surfaces form a lower surface of a transverse plate mounted on said flight means.

13. Apparatus according to claim 2, wherein said flight means is shaped as a flight block having a substantially T-shaped horizontal cross section, with the stem of the T being directed in the direction of the conveying path, the base of the T and the stem comprising support surfaces for confining the carcasses inwards and backwards.

14. Apparatus according to claim 13, wherein said guiding means comprise first guiding members arranged laterally to the conveying path and wherein said flight block is provided with first slots opening sidewardly outwards for receiving said first guiding members.

15. Apparatus according to claim 14, wherein said guiding means comprise second guiding members arranged laterally to the conveying path and arranged at a distance above said first guiding means, wherein said flight block is provided with second slots opening sidewardly outwards for receiving said second guiding members.

16. Apparatus according to claim 14, wherein said flight means comprise confining surfaces for restraining the tail bone of said carcasses upwardly and said second pair of knives is arranged just above said confining surfaces, wherein said confining surfaces form a lower surface of a transverse plate mounted on said flight means, wherein said support surface is formed by a plate means arranged on the flight block at a distance forward of the base of the T.

17. Apparatus according to claim 16, wherein said plate means has a horizontal trailing edge confining the carcasses in a forward direction.

18. Apparatus according to claim 12, wherein said flight block is provided with third lateral slots opening sidewardly outwards for receiving said first pair of knives.

19. Apparatus according to claim 18, wherein said third slots are arranged at a level just above said first slots.

20. Apparatus according to claim 19, wherein said first and said third slots merge into each other in a vertical direction.

21. Apparatus according to claim 17, further comprising a second pair of knives mounted on said frame at a level above the level of said first pair of knives, wherein said second pair of knives is arranged just above said plate means.

22. Apparatus according to claim 21, wherein said first and said second pair of knives are arranged vertically above each other at a distance within the range of 53 mm–65 mm.

23. Apparatus according to claim 22, wherein said distance is 63 mm.

24. Apparatus according to claim 21, wherein said first pair of knives is arranged at a distance above said bearing surface for the lower end of the carcasses which is within a range of 40 mm–50 mm.

25. Apparatus according to claim 24, wherein said distance is 47 mm.

26. Apparatus according to claim 1, said device being a flight conveyor device comprising a flight conveyor adapted to be driven along said conveying path, said flight conveyor being provided with a plurality of flight means spaced from each other at regular intervals in the direction of the conveying path and arranged on a conveyor belt device, said conveyor belt device being provided with an upper surface in an area adjacent and ahead of said flight means for supporting the lower end of the carcasses while the carcasses are entrained by the flight means.

27. Apparatus according to claim 1 for treating carcasses that are divided into two halves, further comprising a separating device for keeping the two carcass halves at a distance from each other separated according to a longitudinal plane of separation, coinciding with the conveying path, said separating device being mounted on said frame.

28. Apparatus for separating carcasses of slaughtered poultry into parts when the carcasses in two halves are transported with their legs supported in shackles forming part of an overhead conveyor system according a conveying path, while said legs are on either side of said conveying path, said apparatus comprising:

a frame for supporting the apparatus on a ground, below said conveyoing path;

at least one pair of knives mounted on said frame, the knives of each said pair of knives being arranged on either side of said conveying path;

means for positioning the carcasses in a proper position with respect to the knives during conveyance of the carcasses, said positioning means comprising first confining means which are arranged for movement along with the carcasses and are adapted for restraining the carcass halves transversely inwards and second confining means for restraining the carcass halves transversely outwards.

29. Apparatus according to claim 28, the positioning means further comprising third confining means which are arranged for being moved along with the carcasses and are adapted for restraining the carcass halves backwards.

30. Apparatus according to claim 28, wherein the positioning means further comprises fourth confining means which are arranged for being moved along with the carcasses and are adapted for restraining the breast bone tip upwardly.

31. Apparatus according to claim 28, wherein the positioning means comprises fifth confining means which are arranged for being moved along with the carcasses and are adapted to support the lower end of the carcasses.

32. Apparatus according to claim 28, wherein the positioning means comprises sixth confining means which are arranged for being moved along with the carcasses and are adapted to engage the carcass halves in an area above the thigh joints.

33. Apparatus according to claim 28, said first confining means comprising a substantially vertical bearing surface which is provided with a projection arranged for engaging an upper portion of the inside surface of a breast cavity.

34. Apparatus according to claim 28, comprising a first pair of knives and a second pair of knives, said first pair of knives being arranged at a distance below said second pair of knives, wherein said second confining means comprise guiding means arranged for engaging the carcass halves between said two pairs of knives to urge said carcass halves transversely inwards.

35. Apparatus according to claim 1, wherein the overhead conveyor is provided with first driving means for driving the overhead conveyor and the flight conveyor device is provided with second driving means for driving the flight conveyor device, said first and second driving means being separate, the apparatus being furthermore provided with control means for adjusting said second driving means so as to index the speed of the flight conveyor device to the speed of the overhead conveyor.

36. Apparatus according to claim 35, wherein said control means comprise means for determining the rate and position of the flight means and means for determining the rate and position of the shackles of the overhead conveyor and comparator means for comparing said rates and positions with each other.

37. Apparatus for separating carcasses of slaughtered poultry into parts when the carcasses are transported with their legs supported in shackles forming part of an overhead conveyor system according a conveying path, while said legs are on either side of said conveying path, said apparatus comprising:

a frame for supporting the apparatus on a ground, below said conveyoing path;

at least one pair of knives mounted on said frame, the knives of each said pair of knives being arranged on either side of said conveying path, further comprising means for keeping the carcass divided into two halves while being conveyed by the overhead conveyor, and means for supporting said carcass halves in an transversely inward direction, means for supporting said carcass halves in an outward transverse direction and means for supporting said carcass halves in a backward direction.

38. Apparatus according to claim 37, wherein the means for supporting the halves transversely inwardly and the means for separating the halves backwardly are arranged for moving along with the carcass halves.

39. Apparatus according to claim 37, further comprising means for supporting the halves in a downward direction, which are arranged for moving along with the carcass halves.

* * * * *